United States Patent [19]

Nishikawa et al.

[11] 4,104,361

[45] Aug. 1, 1978

[54] CATALYST FOR REDUCTION OF NITROGEN OXIDES AND PROCESS FOR PREPARING THE SAME

[75] Inventors: Eiichiroh Nishikawa; Takuji Itoh; Tsugio Maeshima; Setsuo Kamiyama, all of Ohi, Japan

[73] Assignee: Exxon Research & Engineering Co., Linden, N.J.

[21] Appl. No.: 784,959

[22] Filed: Apr. 6, 1977

Related U.S. Application Data

[62] Division of Ser. No. 668,608, Mar. 19, 1976, Pat. No. 4,052,337.

[30] Foreign Application Priority Data

Mar. 28, 1975 [JP] Japan .................................. 50-37676

[51] Int. Cl.² ............................................. B01D 53/34
[52] U.S. Cl. ................................................. 423/239
[58] Field of Search ...................... 423/213.2, 239, 328; 252/445 Z

[56] References Cited

U.S. PATENT DOCUMENTS

| | | |
|---|---|---|
| 3,346,328 | 10/1967 | Sergeys et al. .............. 252/455 Z X |
| 3,366,579 | 1/1968 | Laurent et al. ................... 252/455 Z |
| 3,406,123 | 10/1968 | Sensel et al. ...................... 423/328 X |
| 3,476,508 | 11/1969 | Kearby et al. ........................ 423/239 |
| 3,635,663 | 1/1972 | Moscou ..... ............................ 423/328 |
| 3,895,094 | 7/1975 | Carter .................................. 423/239 |

FOREIGN PATENT DOCUMENTS

| | | |
|---|---|---|
| 804,317 | 2/1974 | Belgium .............................. 423/239 A |
| 1,393,053 | 5/1975 | United Kingdom ................ 423/239 A |

OTHER PUBLICATIONS

Ambs., W. J. et al. "Journal of Catalysis" vol. 14, 1969; pp. 118–125.

*Primary Examiner*—G. O. Peters

[57] ABSTRACT

Nitrogen oxides are removed from gaseous mixtures comprising the same by contacting with a catalyst comprising a base metal component carried on a natural or synthetic zeolite in the presence of ammonia. The alkali metal content of the zeolite is carefully controlled through ion exchange with an alkaline earth metal compound.

12 Claims, No Drawings

CATALYST FOR REDUCTION OF NITROGEN OXIDES AND PROCESS FOR PREPARING THE SAME

This is a division of application Ser. No. 668,608, filed Mar. 19, 1976 now U.S. Pat. No. 4,052,337.

BACKGROUND OF THE INVENTION

This invention relates to a process for reducing the concentration of nitrogen oxides contained in a gaseous mixture. In particular, this invention relates to a process wherein the concentration of nitrogen oxides is reduced by catalytic reduction.

Nitrogen oxides are, of course, generally present in significant quantities in gaseous mixtures such as flue gases. Different methods have been used in the treatment of these gas mixtures. One type of treatment involves the catalytic reduction of nitrogen oxides. As typical processes for removing nitrogen oxides from flue gas by catalytic reduction, there can be mentioned two processes: (1) a nonselective reduction process wherein carbon monoxide, hydrogen or a lower hydrocarbon is used as the reducing agent and (2) a selective reduction process wherein ammonia is used as the reducing agent. In the latter process (selective reduction process with ammonia), a high degree of removal with nitrogen oxide can be obtained with a small amount of reducing agent. Therefore, this process has become of major interest and several variations have been proposed.

The processes for catalytic reduction of nitrogen oxides with ammonia as the reducing agent which have been proposed so far can be divided roughly into two groups: (1) processes using a catalyst wherein the active ingredient is a noble metal such as platinum or palladium and (2) processes using a catalyst wherein the active ingredient is a compound of a base metal, particularly a non-noble transition metal, such as copper, iron, vanadium, chromium and molybdenum. The active ingredients of these catalysts are carried generally on alumina. Noble metal catalysts are defective in that they are seriously poisoned by sulfur dioxide contained in the exhaust gas. On the other hand, the base metal catalyst, while they have good resistance to poisoning by the sulfur oxides, are less active in the catalytic reduction of nitrogen oxides. Therefore, elevation of reaction temperature and reduction of space velocity are required. Exhaust gas to be treated is large in amount and temperature of the exhaust gas is low in general. Therefore, development of a highly active catalyst which can be used under reaction conditions of a low temperature and a high space velocity is desired.

SUMMARY OF THE INVENTION

In accordance with this invention, gaseous mixtures such as flue gases are treated in order to reduce the nitrogen oxide content thereof by contacting with a catalyst comprising a base metal, particularly a non-noble transition metal, component carried on a zeolite carrier in the presence of ammonia. The amount of alkali metals in the zeolite is limited to certain amounts. In addition at least one base (non-nobel transition) metal is carried on said zeolite by impregnation rather than ion exchange. In one embodiment the amount of alkali metal contained in the zeolite is controlled by contacting the alkali metal-containing zeolite with a solution containing an alkaline earth metal cation. The process of the present invention is especially suitable for removing nitrogen oxides from a gas containing nitrogen oxides, sulfur compounds and oxygen.

DETAILED DESCRIPTION OF THE INVENTION

The present invention relates to a catalyst for reduction of nitrogen oxides and a process for preparing this catalyst. More particularly, the invention relates to a catalyst for reducing and thereby removing nitrogen oxides from a flue gas containing nitrogen oxides, sulfur oxides and oxygen and a process for production thereof.

Typical processes for removing nitrogen oxides from flue gas by catalytic reduction are (1) non-selective reduction process wherein carbon monoxide, hydrogen or a lower hydrocarbon is used as reducing agent and (2) selective reduction process wherein ammonia is used as reducing agent.

Catalysts used in these processes can be divided into two groups roughly, i.e., (1) noble metal catalysts containing platinum, palladium, etc., and (2) base metal catalysts containing copper, iron, vanadium, chromium, molybdenum, etc. Those active metal components are carried on a refractory carrier such as alumina or silica. The noble metal catalysts are easily poisoned by sulfur oxides contained in the flue gas. The base metal catalysts have a defect that carrier such as aluminum is converted into its sulfate during the continuous use, though the active metal components thereof are relatively seriously poisoned by sulfur oxides. Further, the base metal catalysts having low activities and selectivities in general require severe reaction conditions. Under the circumstances as above, the development of a catalyst of a long life with which nitrogen oxides can be removed efficiently at a low temperature at a high space velocity is demanded.

The present invention relates to a catalyst and a process for production thereof for the reduction of nitrogen oxides in flue gas which comprises at least one active metal component carried, by impregnation, on a crystalline aluminosilicate carrier in which a part of alkali metal is cation-exchanged with an alkali earth metal ion.

The first invention relates to a catalyst for reduction of nitrogen oxides which comprises one or more active metal components, having an effect of reducing nitrogen oxides, carried by impregnation on a crystalline aluminosilicate obtained by ion exchange with alkaline earth metal(s) so that alkali metal content will be 0.2–0.6 equivalent per gram-atom of aluminum.

The second invention relates to a process for preparing a catalyst for reduction of nitrogen oxides, characterized in that a synthetic crystalline aluminosilicate is contacted with a medium containing alkaline earth metal ion(s) to ion-exchange the alkali metals in the synthetic crystalline aluminosilicate with the alkaline earth metal(s), the ion-exchanged synthetic crystalline aluminosilicate is contacted with a medium containing one or more active metal ions having an effect of reducing nitrogen oxides, under such a condition that ion exchange will not occur, whereby the active metal component(s) is (are) carried on the aluminosilicate by impregnation.

The first characteristic feature of the reduction catalyst for nitrogen oxides according to the present invention is that a crystalline aluminosilicate which has been controlled so as to have a predetermined amount of alkali metal by cation exchange is used as carrier. Namely, alkali metal in the crystalline aluminosilicate is controlled to 0.2–0.6 equivalent per gram-atom of aluminum in the crystalline aluminosilicate.

Aluminum in the crystalline aluminosilicate herein indicates aluminum in a neutralized form which is combined with an alkali metal or alkaline earth metal, excluding aluminum contained in alumina sol, alumina, silica-alumina, etc., which are added as binder or diluent in molding the catalyst or carrier or aluminum cation which is introduced therein in ion exchange with alkali metals.

The second characteristic feature of the present invention is that an active metal component having an activity of reducing nitrogen oxides is carried on a carrier by impregnation instead of ion exchange.

The synthetic crystalline aluminosilicates used in the present invention have a chain, laminate or three-dimensional reticulate framework structure in which methane-type $SiO_4$ tetrahedron is combined with $AlO_4$ tetrahedron through oxygen covalent bond. The $AlO_4$ tetrahedron having one negative charge is combined with a corresponding cation and water of crystallization is kept by electrostatic attraction of the cation. As the cations, alkali metal ions such as sodium or potassium are included therein.

The spaces surrounded by the $SiO_4$ tetrahedrons and $AlO_4$ tetrahedrons form cavities or channel comprising the cavities connected with each other. Water of crystallization is kept in the cavities. Upon heating, the water is taken off to form porous adsorption medium. Substances to be adsorbed are introduced in the cavities or the channel through pores of the network structure of the aluminosilicate. The pores having a uniform diameter exhibit an effect of molecular sieve. Namely, only molecules having diameters less than pore diameter are adsorbed, leaving molecules of larger diameters.

The crystalline aluminosilicates are classified according to pore diameter and $SiO_2/Al_2O_3$ molar ratio. In the present invention, those having pore diameters in the range of about 3–15 A and $SiO_2/Al_2O_3$ molar ratios of above about 2 are suitable.

As crystalline aluminosilicate, there may be used synthetic faujasite and synthetic mordenite. The synthetic faujasites include:

Zeolite-A 1.0 ± $0.2M_{2/n}O:Al_2O_3$:1.85 ±$0.5SiO_2$:$YH_2O$ (wherein M represents a metal, $n$ represents a valence of M and Y represents a number of below about 6.)

Zeolite-X 1.0 ±$0.2M_{2/n}O:Al_2O_3$:2.5 ±$0.5SiO_2$:$YH_2O$ (wherein M represents a metal of a valence of less than three inclusive, $n$ represents a valence of M and Y represents a number of below about 8.)

Zeolite-Y 0.9 ±$0.2Na_2O:Al_2O_3$:$WSiO_2$:$YH_2O$ (wherein W represents a number of 3–6 and Y represents a number of below about 9.)

The synthetic faujasites also include those prepared by other processes. The synthetic mordenites include, for example:

Zeolite-L 1.0 ±$0.1M_{2/n}O:Al_2O_3$:0.4 ±$0.5SiO_2$:$YH_2O$ (wherein M represents a metal, $n$ represents a valence of M, and Y represents a number of 0–7.)

The synthetic mordenites include further other products such as "Zeoron" (manufactured by Norton Chemical Corporation), etc.

Especially preferred crystalline aluminosilicates are those having a pore diameter in the range of about 6–13 A and $SiO_2/Al_2O_3$ molar ratio of about 2–6. For example, synthetic faujasites having a pore diameter of about 8–9 A and $SiO_2/Al_2O_3$ molar ratio of about 2–3 and other synthetic faujasites having a pore diameter of about 8–9 A and $SiO_2/Al_2O_3$ molar ratio of about 4–6 are preferred.

The ion exchange for controlling an alkali metal in the aluminosilicate to 0.2–0.6 equivalent per gram-atom of aluminum can be effected by contacting the aluminosilicate with an aqueous or non-aqueous (organic solvent or the like) solution containing an alkaline earth metal ion. In such an ion exchange, water is the most preferred medium in view of procedure and apparatus. Organic solvents capable of ionizing the alkaline earth metal compound used may be employed. Preferred solvents are, for example, alcohols such as methanol, ethanol, propanol and butanol; amides such as dimethylformamide and diacetoamide; ethers such as diethylether and ketones such as dimethylketone and methylethylketone.

As alkaline earth metal ion sources, there may be used at least one metal selected from the group consisting of calcium, magnesium, barium and strontium. The most preferred alkaline earth metal is calcium. As the metal ion sources, there may be used inorganic and organic salts such as chlorides, bromides, carbonates, sulfates, nitrates, formates and oxalates.

In the ion exchange, an aluminosilicate containing an alkali metal is immersed in a medium containing one or more alkaline earth metal ions once or repeatedly or the medium containing said cation is allowed to flow downward through a catalyst column filled with the aluminosilicate to contact the medium with the aluminosilicate whereby a certain amount of the alkali metal is replaced with the ion and thereby removed.

Concentration of the cation in the medium, contact time and amount of the aluminosilicate used for the ion-exchange may be selected suitably under such conditions that alkali metal is in an amount of 0.2–0.6 equivalent per gram-atom of aluminum.

The aluminosilicate ion-exchanged with ammonium ion is washed and, if necessary, calcined at a temperature in the range of about 300°–700° C., preferably about 350°–600° C.

By the above-described ion exchange, alkali metal in the aluminosilicate is controlled to 0.2–0.6 equivalent per gram-atom of aluminum. If amount of alkali metal is more than 0.6 equivalent or less than 0.2 equivalent, it is difficult to obtain a high selectivity in catalytic reduction of nitrogen oxides.

The crystalline aluminosilicates according to the present invention may be incorporated with about 1–30 wt. % of at least another refractory material, i.e., inorganic oxide such as alumina, magnesia, titania, zirconia, hafnia, silica or diatomatceous earth. In the preparation of molded catalyst products, a binder such as alumina sol may be added in a suitable amount such as about 2–40 wt. %.

The second characteristic feature of the catalyst of the present invention is that an active metal component which acts on nitrogen oxides is carried on thus prepared aluminosilicate carrier by impregnation. As the active metal component, there is used at least one member selected from the base metal components, such as copper, iron, cobalt, nickel, vanadium, molybdenum, chromium, tungsten, tin, antimony, manganese, etc., or Group VIII noble metal components, such as platinum, palladium, rhodium, iridium and ruthenium.

The most preferred active metal components are at least one member selected from the group of copper, iron, chromium and vanadium.

Suitable forms of active metal components are metals, oxides, sulfates and mixtures thereof. Particularly preferred are sulfates of copper and iron, and oxides of chromium and vanadium. The active metal component is contained in a catalytically effective amount, for example about 1-20 wt. %, preferably about 2-20 wt. % as metal, based on the final catalyst.

The support of the active metal component on aluminosilicate is effected by impregnation. In the impregnation, aluminosilicate carrier is immersed in a solution obtained by dissolving soluble active metal compound in a suitable solvent and then the carrier impregnated with the active metal component is separated from the solution. Concentration of the metal compound in the impregnation solution, quantity of the solution used for the impregnation, immersion time and temperature can be selected suitably so that a desired amount of the active metal component is carried.

It is considered generally that, if a crystalline aluminosilicate is contacted with a cation-containing solution for a long period of time, cation exchange takes place. However, according to the present invention, crystalline aluminosilicate treated as above is contacted with a solution containing active metal ion(s) under such a condition that said cation exchange will not take place, whereby the active metal ion(s) is (are) carried on the aluminosilicate by impregnation. According to the present invention, active metal components can be carried on the carrier by other means than ion exchange and thus resulting catalyst containing crystalline aluminosilicate as carrier exhibits a remarkable resistance to poisoning from sulfur oxides, as shown in Examples given below. As for impregnation conditions, immersion time is within the range of from about 5 minutes to about 1 hour which is far shorter than that of ion exchange process. It is important to fix the immersion time so as not to cause ion exchange with due regard to influences exerted by other conditions. It is necessary to carry the active metal component on the carrier under such a condition that alkali metal ions and alkaline earth metal ions in the aluminosilicate are not removed.

The soluble compounds of active metals used in the impregnation are decomposable at a high temperature and convertible into oxides by calcination. Preferred compounds include, for example, inorganic salts such as nitrates, chlorides and sulfates and organic salts such as acetates, tartarates and oxalates. As solvents for the impregnation solution, there may be used water, inorganic acids, organic acids and other organic solvents as well as mixtures thereof. As the inorganic acids, hydrochloric acid, nitric acid and sulfuric acid diluted with water are used. Suitable orgaic acids are mono- and polycarboxylic acids such as acetic acid and citric acid. Other suitable organic solvents are alcohols, aldehydes, amines and esters. Alcohols usable are those having 1-10 carbon atoms. Particularly, isopropyl alcohol, n-butyl alcohol, isobutyl alcohol, pentyl alcohol and isopentyl alcohol are preferred. As aldehydes, there may be used those of 1-10 carbon atoms, particularly acetoaldehyde, ethyl aldehyde and propyl aldehyde. As amines, there may be used alkylamines such as dimethylamine and triethylamine. As esters, there may be used ethyl formate, ethyl acetate, isopropyl acetate and butyl acetate. The impregnation with the active metal component will be illustrated with reference to copper component: the aluminosilicate carrier prepared as above is immersed in an aqueous solution of copper nitrate, copper chloride or copper sulfate to impregnate the carrier with the copper component.

After the impregnation with active metal component, the catalyst is separated from the solution and heated to a temperature in the range of about 80°–150° C. in the presence or absence of oxygen. Finally it is calcined at a temperature in the range of about 300°–700° C. to obtain oxide thereof as the active metal component. For obtaining sulfate as the active metal component, said carrier is impregnated with the solution of the metal sulfate or the oxide is contacted with a sulfur compound such as a sulfur oxide or mercaptan.

For employing the catalyst of the present invention in the reduction of nitrogen oxides contained in the exhaust gas, there can be adopted any shape such as cylindrical, spherical or Raschig ring shape having a large contact surface in which gas flow is easy.

The catalyst of the present invention exhibits a remarkable effect in removing nitrogen oxides from a flue gas from a boiler or the like in the presence of oxygen and sulfur oxides. More particularly, nitrogen oxides can be reduced selectively by mixing flue gas containing nitrogen oxides, sulfur oxides and oxygen with ammonia and then contacting the resulting gaseous mixture with the catalyst of the invention.

The reduction of nitrogen oxides with ammonia comprises conversion of nitrogen oxides into innoxious nitrogen as shown by the following equations:

$$6NO + 4NH_3 \rightarrow 5N_2 + 6H_2O$$

$$3NO_2 + 4NH_3 \rightarrow 7/2N_2 + 6H_2O$$

The reduction with carbon monoxide, hydrogen or a hydrocarbon can be shown by the following equations:

$$NO + CO \rightarrow \tfrac{1}{2}N_2 + CO_2$$

$$NO + H_2 \rightarrow \tfrac{1}{2}N_2 + H_2O$$

$$NO + (2/4\, m+n)C_mH_n \rightarrow \tfrac{1}{2}N_2 + (2m/4m+2)CO_2 + (n/4m+n)H_2O$$

The catalyst of the present invention can be used together with any reducing agent and particularly preferred reducing agent is ammonia.

As exhaust gas suitable to be treated with the catayst of the invention, there may be mentioned flue gases from boilers of power plants, etc., as described above. The flue gases contain generally sulfur oxides and oxygen in addition to nitrogen oxides. The composition of a typical flue gas is as shown below:

$NO_x$ about 0.01 – 0.05%

$SO_x$ about 0.01 – 0.3%

$O_2$ about 3 – 7%

According to the present invention, nitrogen oxides can be removed sufficiently even in the presence of sulfur compounds.

Amount of ammonia to be added as reducing agent to exhaust gas should be more than about 0.7 times as much as stoichiometric amount required for reducing nitrogen oxides into completely innoxious nitrogen. In case a major part of nitrogen oxides is nitrogen monoxide (NO), more than about 0.5 moles of ammonia is required per mole of the nitrogen oxide. Particularly preferred amount of ammonia ranges from stoichiometric amount to about 1.5 moles per mole of nitrogen oxide ($NO_x$, $x=1$).

Even if an excess ammonia is added temporarily, ammonia is not contained in flue gas discharged after the treatment, since adsorptivity of the catalyst is very high.

Gaseous mixture of the exhaust gas containing nitrogen oxide and reducing agent is contacted with the fixed bed catayst, reaction conditions being a temperature of about 200°–500° C., preferably about 250°–400° C. and a gas space velocity of about 2,000–100,000 V/H/V, preferably about 5,000–30,000 V/H/V.

Thus, the invention provides a new catalyst for reduction of nitrogen oxides in the presence of oxygen and the method of preparation thereof. As compared with conventional catalysts containing alumina as carrier and zeolite carrier obtained by ion exchange with a catalytic metal, the catalyst of the invention exhibits quite excellent activity and selectivity even at a low temperature and a high space velocity. Catalytic metal exchanged zeolite catalysts are seriously poisoned by sulfur oxides to lower their activities, whereas the zeolite catalyst containing alkaline earth metal of the invention has a long life, being not poisoned by sulfur oxides.

The catalyst of the invention exhibits the effect of removing nitrogen oxides for a long period of time, for example, in the presence of about 50–5,000 ppm. of sulfur oxides. The present invention will be illustrated by way of examples.

EXAMPLE 1

A copper carrying zeolite catalyst was prepared as follows:

100 grams of zeolite-Y (synthetic faujasite) which had been extrusion-molded into a size of 1.5mm (diameter) × 6mm (length) were immersed in 500 ml. of 2N aqueous calcium chloride solution. Ion exchange was effected under proper agitation at 70° C. for about 3 hours. After the ion exchange, zeolite was taken off from solution. This procedure was repeated three times. The zolite was washed with water, dried and then calcined in air at 450° C. for 3 hours to obtain catayst carrier containing 0.2 equivalent of sodium and 0.8 equivalent of calcium per gram-atom of aluminum contained in the zeolite. 50 grams of the catalyst carrier was immersed in 100 ml. of aqueous copper nitrate solution containing 4 wt. % of copper and the whole was allowed to stand at room temperature for 30 minutes. The carrier was taken out from the solution, dried and calcined at 500° C. for 16 hours to obtain zeolite catalyst carrying 3 wt. % of copper.

20 milliliters of the copper-carrying zeolite catalyst prepared as above were charged in a quartz reaction tube of an inside diameter of 18 mm. In the fixed bed of catalyst thus obtained, a gaseous mixture comprising 250 ppm. of NO, 300 ppm. of $SO_2$, 10% of $CO_2$, 3% of $O_2$, 10% of $H_2O$ and the remainder of $N_2$, which had been added with 250 ppm. of ammonia was introduced. Gas flow was adjusted to a space velocity of 20,000 V/H/V (space velocity). Removal percentages of nitrogen oxide at varied catalyst bed temperatures were as shown below:

| Catalyst bed temperature (° C.) | Removal percentage of nitrogen oxides (%) |
| --- | --- |
| 300 | 80 |
| 350 | 90 |
| 400 | 95 |
| 450 | 88 |
| 500 | 75 |

EXAMPLE 2

100 grams of zeolite Y which had been extrusion-molded into a size of a diameter of 1.5 mm and a length of 6 mm were immersed in 500 ml. of 2N aqueous calcium chloride solution. Ion exchange was effected under proper agitation at room temperature for about 12 hours. This procedure was repeated twice. After washing with water and drying, catalyst carrier containing 0.35 equivalent of sodium and 0.65 gram-equivalent of calcium per gram-atom of aluminum in the zeolite was obtained. 50 grams of the catalyst carrier were immersed in 100 ml. of aqueous copper nitrate solution containing 4 wt. % of copper (Cu) and the whole was allowed to stand at room temperature for 30 minutes.

The carrier was taken off from the solution, dried and then calcined at 500° C. for 16 hours to obtain zeolite catalyst carrying 3 wt. % of copper.

The catalyst thus obtained was utilized in the same manner as in Example 1. The results were as shown below:

| Catalyst bed temperature (° C.) | Removal percentage of nitrogen oxide (%) |
| --- | --- |
| 300 | 72 |
| 350 | 88 |
| 400 | 89 |
| 450 | 84 |

Comparative Example 1

A catalyst comprising 2 wt. % of copper carried on γ-alumina (specific surface area: 110 m²/g) was used under the same conditions as in Example 1. Removal percentages of nitrogen oxide at varied catalyst bed temperatures were as shown below:

| Catalyst bed temperature (° C.) | Removal percentage of nitrogen oxide (%) |
| --- | --- |
| 300 | 37 |
| 350 | 55 |
| 400 | 61 |
| 450 | 58 |

Comparative Example 2

The same gas as in Example 1 was treated with the zeolite carrier containing 0.2 equivalent of sodium and 0.8 equivalent of calcium per gram-atom of aluminum prepared in Example 1 but not carrying copper at a gas space velocity of 5,000 V/H/V at a temperature of 200°–500° C. Removal percentage of nitrogen oxide was less than 20%.

Comparative Example 3

(A) 100 grams of the same zeolite-Y as in Example 1 were immersed in 500 ml. of 1.0 N aqueous copper acetate solution. Ion exchange was effected under proper agitation at room temperature for about 2 hours. This procedure was repeated four times. Zeolite was taken off from the solution, washed with water, dried and calcined in air at 500° C. for 3 hours to obtain a catalyst containing 0.42 equivalent of sodium per gram-atom of aluminum. Copper content of the catalyst was 6.20 wt. %.

(B) A catalyst containing 0.85 equivalent of sodium per gram-atom of aluminum was obtained in the same manner as in above (A) except that the ion exchange procedure was performed only once. Copper content of the catalyst was 3.41 wt. %. The copper content of the catalyst was thus comparable with that of the catalyst obtained in Example 1.

Removal percentages of nitrogen oxide by those catalysts at varied catalyst bed temperatures were determined under the same conditions as in Example 1 to obtain the following results:

|  | Catalyst bed Temp. (° C.) | Removal percentage of nitrogen oxide (%) |
|---|---|---|
| Catalyst A | 300 | 70 |
| " | 350 | 86 |
| " | 400 | 81 |
| " | 450 | 70 |
| Catalyst B | 300 | 52 |
| " | 350 | 41 |
| " | 400 | 43 |
| " | 450 | 41 |

EXAMPLE 3

100 grams of zeolite-Y were immersed in 500 ml. of 2.0 N aqueous magnesium chloride solution. Ion exchange was effected under proper agitation at room temperature for about 24 hours. This procedure was repeated twice. Zeolite was washed with water, dried and calcined in air at 500° C. for 3 hours to obtain catalyst carrier. The catalyst contained 0.23 equivalent of sodium and 0.77 equivalent of magnesium per gram-atom of aluminum.

The zeolite carrier obtained as above was immersed in an aqueous solution containing 4 wt. % of copper (Cu) and the whole was allowed to stand at room temperature for 30 minutes. The copper-carrying zeolite was taken off from the solution, dried and calcined at 500° C. in air for 16 hours to obtain catalyst carrying 3 wt. % of copper.

Removal percentages of nitrogen oxide at varied catalyst bed temperatures were determined under the same conditions as in Example 1 to obtain the following results:

| Catalyst bed temperature (° C.) | Removal percentage of nitrogen oxide (%) |
|---|---|
| 300 | 63 |
| 350 | 84 |
| 400 | 88 |
| 450 | 91 |
| 500 | 87 |

EXAMPLE 4

The same treatment as in Example 1 was effected except that sulfur dioxide content of the gas was altered and that catalyst bed temperature was fixed at 400° C. to obtain the following results:

| $SO_2$ (ppm) | 0 | 300 | 2,000 | 5,000 |
|---|---|---|---|---|
| NO Conversion (%) | 95.0 | 95.0 | 95.0 | 94.9 |

Comparative Example 4

The copper-exchanged zeolite catalyst obtained in Comparative Example 3(A) was assessed in the same manner as in Example 3.

| $SO_2$ (ppm) | 0 | 300 | 2,000 | 5,000 |
|---|---|---|---|---|
| NO conversion (%) | 81.0 | 81.0 | 25.0 | — |

From the above results, as compared with conventional zeolite catalysts obtained by ion exchange, the zeolite catalyst of the invention exhibits excellent activity and selectivity at both high and low temperature ranges though the amount of active metal components carried on the catalyst is small. Further, in the presence of sulfur oxides, ion exchanged catalysts are seriously lowered their activity, whereas the catalyst of this invention maintains high activity, being not poisoned by sulfur oxides.

What is claimed is:

1. A process for treating a gaseous mixture comprising nitrogen oxides and oxygen in order to reduce the nitrogen oxides content thereof which comprises contacting said gaseous mixture and ammonia with a catalyst comprising at least one base metal component impregnated on a synthetic zeolite which has been ion exchanged with at least one alkaline earth metal ion to ion exchange the alkali metal in the zeolite so that the alkali metal content remaining is within the range from 0.2 to 0.6 equivalents per gram atom of aluminum, said contacting conducted at a temperature of from about 200° to 500° C.

2. The process according to claim 1 in which the amount of ammonia used is at least about 0.5 moles per mole of nitrogen oxides present in said gaseous mixture.

3. The process of claim 1 wherein the base metal component comprises about 1–20 wt. % (as metal), based on the final catalyst.

4. The process of claim 1 wherein the metal portion of the base metal component is at least one member selected from the group consisting of copper, iron, chromium or vanadium.

5. A process for treating a gaseous mixture comprising about 0.01 to 0.05% nitrogen oxides and about 3 to 7% oxygen in order to reduce the nitrogen oxides content thereof which comprises contacting said gaseous mixture and at least about 0.5 mole of ammonia per mole of nitrogen oxides present in said gaseous mixture with a catalyst comprising at least one transition metal component wherein the metal portion of said transition metal component is at least one member selected from the group consisting of copper, iron, chromium or vanadium impregnated on a synthetic zeolite which has been ion exchanged with at least one alkaline earth metal ion to ion exchange the alkali metal in the synthetic zeolite so that the alkali metal content remaining is within the range from 0.2 to 0.6 equivalents per gram atom of aluminum, said zeolite having a $SiO_2/Al_2O_3$ molar ratio greater than about 2 and having pores having a diameter in the range of from about 3–15 Angstroms, said contacting conducted at a temperature of from about 200° to 500° C.

6. The process of claim 5 wherein the ion exchange is accomplished with a calcium ion.

7. The process of claim 6 wherein said gas mixture contains from 0.01 to 0.3% sulfur oxides.

8. The process of claim 5 wherein said contacting is conducted at a temperature ranging from about 250° to 400° C.

9. The process of claim 7 wherein said contacting is conducted at a temperature ranging from about 250° to 400° C.

10. The process of claim 5 wherein the metal portion of said transition metal component is copper.

11. The process of claim 6 wherein the metal portion of said transition metal component is copper.

12. The process of claim 9 wherein the metal portion of said transition metal component is copper.

* * * * *